V. E. THOMAS.
TRACTOR WHEEL RIM.
APPLICATION FILED JUNE 12, 1917.

1,258,501.

Patented Mar. 5, 1918.

WITNESSES

INVENTOR
V. E. Thomas.
BY Victor J. Evans
ATTORNEY

UNITED STATES PATENT OFFICE.

VERN E. THOMAS, OF HAZEN, NORTH DAKOTA.

TRACTOR-WHEEL RIM.

1,258,501.  Specification of Letters Patent.  Patented Mar. 5, 1918.

Application filed June 12, 1917. Serial No. 174,404.

*To all whom it may concern:*

Be it known that I, VERN E. THOMAS, a citizen of the United States, residing at Hazen, in the county of Mercer and State of North Dakota, have invented new and useful Improvements in Tractor-Wheel Rims, of which the following is a specification.

This invention relates to wheels for motor vehicles, and more especially to traction wheels having a supplemental rim; and the object of the same is to produce an attachment capable of application to the rim of an ordinary motor vehicle wheel whereby its circumference may be enlarged and widened and provided with teeth or spurs to indent the earth and with a ring of sprocket teeth along one side for engaging the links of the driving chain.

All this is accomplished by attaching a supplemental rim to the wheel, and the construction of the rim itself and of the details of attachment will be found in the following specification, reference being had to the accompanying drawings wherein:—

Figure 1:
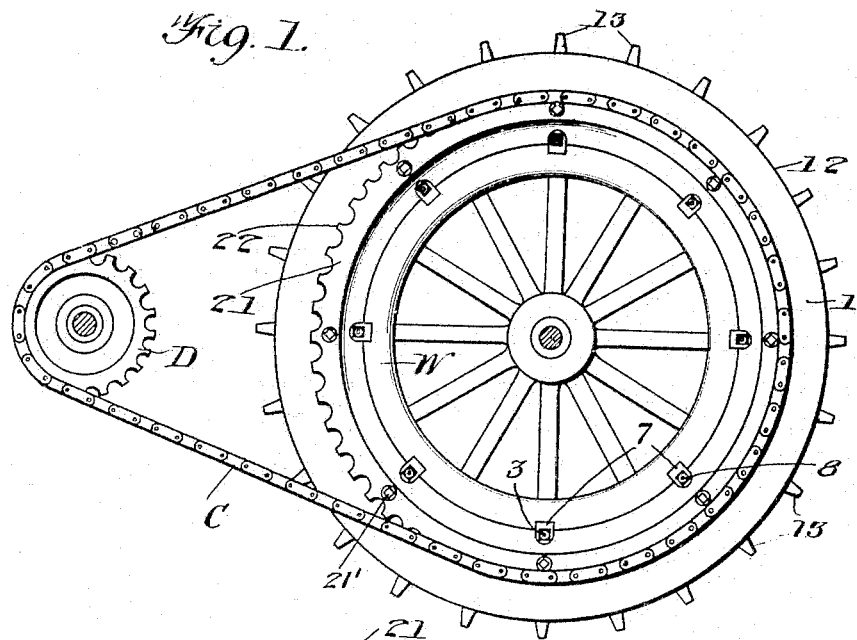
Figure 1 is a side elevation of this improved wheel, with a drive chain leading from a driving sprocket.
Figure 3:
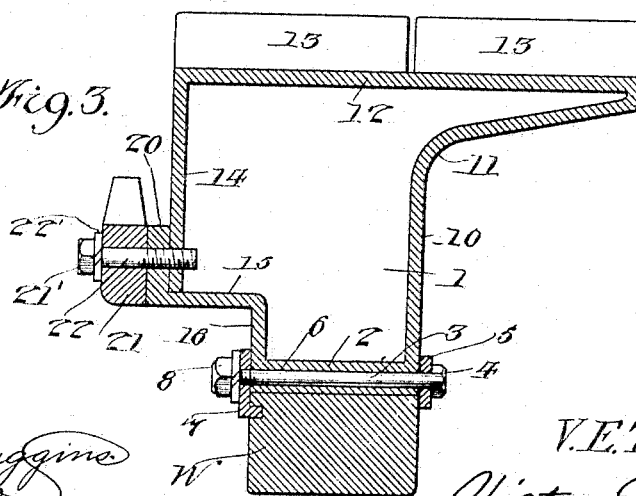
Fig. 3 is an enlarged sectional detail through the rim of the motor vehicle wheel and the improved tractor wheel and sprocket.

In the drawings I have employed the letter W to designate an ordinary wheel as now in common use on motor vehicles such as the Ford automobile or the like, and the tire is completely removed from the wheel-rim as seen in Fig. 3. The broad purpose of this invention is to convert such a wheel into a somewhat larger tractor wheel having a wide toothed face for engaging the earth as is required in traction machines, so that the ordinary Ford car can be converted into a traction car, provided of course that the front wheels or tires will answer or that the tires be replaced by broader ones so that the vehicle can run over soft earth—however this detail need not be amplified herein. If the automobile so converted be of the chain-drive type, my tractor rim will have as part of it a ring of teeth constituting a driven sprocket wheel, to be connected by a chain C with the driving sprocket D of the automobile, as illustrated only in Fig. 1; but if the driving wheel of the automobile is driven through its axle or by some other means, this sprocket will not be necessary. In the following description, however, I have set forth the details of the tractor rim with this sprocket, on the understanding that the sprocket may be omitted if it is not necessary.

Coming now to the specific construction of parts, the tractor rim has an annular body 1 which is preferably hollow for sake of lightness, its radially inner wall 2 being a band which closely surrounds the periphery of the wheel rim W, and means are provided to hold it removably thereon. In the present case such means comprises a series of bolts 3 whose heads 4 are on the outside of the wheel and whose shanks next their heads pass through a washer or ring 5, then through openings or channels 6 formed in the band 2, and finally through clip plates 7 at the inner side of the wheel and receive nuts 8 as shown in Fig. 3; and when these nuts are set up tight the clip plates are drawn against one side of the wheel rim W whereas the washer or ring 5 is drawn against the other side of this wheel and against the outer wall of the traction rim. I do not wish to be limited, however, to the specific form of fastening means, as any well-known method of mounting a demountable rim on the wheel may be employed at this point.

Figure 2:
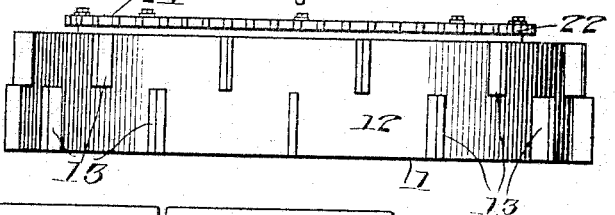
Fig. 2 is a plan view of the completed tractor wheel.

The outer side wall 10 of the tractor rim stands preferably in a plane with the outer edge of the wheel rim W so that the ring 5 may overlie both as shown, and at its radially outer edge this wall curves so as at 11 to produce a rather wide tread surface or tire 12, the latter constituting the radially outer wall of the rim. This tire is by preference provided with teeth or projections 13 which may be staggered as seen in Fig. 2 and their obvious purpose is to embed the soft soil. From the other or inner side edge of the outer wall or tire 12, the metal of the rim is carried radially inward in what might be called the inner side wall 14 which I prefer to dispose in a plane somewhat inside of the plane of the inner edge of the wheel rim W. At its radially inner edge this wall is carried inward parallel with the axis of the wheel in a shoulder 15, and from the shoulder the metal extends again radially inward at 16 and unites with the other edge of the band 2. The tractor rim may be made of sheet metal rolled into the form described, or it may be cast or otherwise formed; in fact, it is quite possible that it could be made solid and that its external configuration could differ somewhat from that set forth. It is in my opinion essential that its inner band shall fit around the wheel rim W like the rim of a demountable tire and that its outer wall or tire 12 shall be quite wide so as to give an ample tread surface to the tractor rim. The distance between the band 2 and the tire 12 enlarges the radius of the wheel and therefore enlarges its circumference.

If the motor vehicle to which this improved tractor tire is applied is such as has a chain drive, the chain C may be led from its driving sprocket D and is necessarily connected with a sprocket on the drive wheel. For this purpose I increase the size of the sprocket so that the enlarged wheel will be driven somewhat slower than the motor wheel W before the application of the tractor rim. Again referring to Fig. 3, the inner side wall 14 is preferably reinforced as at 20 to give it greater thickness and strength. If this rim is made of rolled metal, it is quite possible that one edge of the strip forming the rim may here overlap the other edge and be attached thereto in any suitable manner in order to produce this reinforce. The driven sprocket now is applied. It has an annular body 21 pierced with openings through which pass screws 22 whose inner ends are engaged with holes in the reinforced portion 20 of the rim and whose heads 21' may overlie split or spring washers 22'; and the body carries a series of teeth 23 which are so shaped and disposed that they respectively engage the links in the sprocket chain C. By preference this driven sprocket is disposed at the inner side of the tractor rim, and of course it is in alinement with the drive sprocket D. The latter is driven from the engine and is controlled by a clutch and transmission mechanisms, each operated by its lever as usual.

When now a tractor rim of this character is applied to the rim of an ordinary motor vehicle wheel, such as W, the wheel will be increased in diameter and therefore in circumference, and the width of its tread or tire will be increased, whether the teeth 13 are used or not. If the motor vehicle be a chain-drive machine, the driven sprocket will be employed, and links will be added to or taken from the chain C as necessary. It is quite possible that the size of the driving sprocket D may be reduced, but changes therein may be left to the user and made by him according to the power and speed with which he expects to drive the traction vehicle when it is finished.

What is claimed as new is:—

1. The herein described traction attachment for motor vehicles, the same comprising a tractor wheel rim adapted to fit closely around the rim of the driving wheel, a ring carried thereby and having a series of teeth constituting a driven sprocket wheel adapted to be engaged by the driving sprocket chain, and means for fastening said rim on the vehicle wheel.

2. The herein described tractor wheel rim whose radially inner wall is of a size to fit around the rim of a motor vehicle wheel and whose body comprises inner and outer side walls projecting radially from said inner wall and diverging at their outer edges, and a radially outer wall connecting said outer edges and constituting the tread surface of the rim, teeth on said surface, and fastening means for connecting the radially inner wall thereof with the wheel rim.

3. The herein described tractor wheel rim whose radially inner wall is of a size to fit around the rim of a motor vehicle wheel and whose body comprises axially inner and outer side walls projecting radially from said inner wall and diverging at their outer edges, and a radially outer wall connecting said outer edges and constituting the tread surface of the rim, teeth on said surface, said radially inner wall having transverse channels at intervals, bolts through said channels, clip plates under the nuts of said bolts engaging the inner side of the wheel rim, and a washer under the heads of said bolts engaging the outer side of said wheel rim and the outer side wall of the tractor rim.

4. The herein described tractor wheel rim for removable attachment to the rim of a motor vehicle wheel, the same made of sheet metal rolled to produce a flat band adapted to surround said wheel rim, an outer side wall projecting from the outer edge of said band and curved at its outer edge away from the plane of said wheel, an inner side wall projecting from the inner edge of said band, shouldered and carried inward away from the plane of said wheel, and then projecting radially outward, a tread connecting the radially outer edges of said side walls, and teeth on said tread.

5. The herein described hollow tractor wheel rim having a radially inner wall adapted to be secured around the periphery of a motor vehicle wheel and a radially outer wall constituting the tread, its inner side wall being shouldered adjacent said radially inner wall and reinforced adjacent the shoulder; combined with a driven sprocket consisting of a ring lying against said reinforce and having radial sprocket teeth, and fastening means extending through said ring and into the reinforce.

In testimony whereof I affix my signature.

VERN E. THOMAS.